United States Patent
Ho et al.

(10) Patent No.: US 8,605,047 B2
(45) Date of Patent: Dec. 10, 2013

(54) THRESHOLD COMPENSATION METHOD ON TOUCH DEVICE

(75) Inventors: Cheng-Hsiang Ho, Hsin-Chu (TW); Yu-Min Hsu, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 269 days.

(21) Appl. No.: 13/108,456

(22) Filed: May 16, 2011

(65) Prior Publication Data
US 2011/0298734 A1 Dec. 8, 2011

(30) Foreign Application Priority Data
Jun. 8, 2010 (TW) .............................. 99118611 A

(51) Int. Cl.
*G06F 3/041* (2006.01)
(52) U.S. Cl.
USPC ......................................... 345/173; 345/178
(58) Field of Classification Search
None
See application file for complete search history.

(56) References Cited

U.S. PATENT DOCUMENTS

| | | | |
|---|---|---|---|
| 2003/0189552 A1* | 10/2003 | Chuang et al. | 345/173 |
| 2006/0097991 A1 | 5/2006 | Hotelling et al. | |
| 2010/0053090 A1* | 3/2010 | Hong et al. | 345/173 |
| 2010/0079397 A1 | 4/2010 | Yang et al. | |

FOREIGN PATENT DOCUMENTS

TW 201015412 A 4/2010

\* cited by examiner

*Primary Examiner* — Joseph Haley
*Assistant Examiner* — Carl Adams
(74) *Attorney, Agent, or Firm* — WPAT, PC; Justin King

(57) ABSTRACT

The disclosure provides a threshold compensation method applied to a touch device including a plurality of touch points. The threshold compensation method includes steps of: selecting at least one of the plurality of touch points as a selected object; obtaining a sensing data of each the touch point of the selected object in each of multiple initializing frequency periods; obtaining a sensing data difference value between the sensing data of each the touch point of the selected object in each adjacent two of the initializing frequency periods; obtaining a maximum sensing data difference value in the multiple sensing data difference values of the selected object in the multiple initializing frequency periods; and setting a default threshold of the selected object according to the maximum sensing data difference value.

11 Claims, 4 Drawing Sheets

THRESHOLD COMPENSATION METHOD ON TOUCH DEVICE

BACKGROUND

1. Technical Field

The present invention is related to touch technologies, and more particularly to a threshold compensation method on a touch device.

2. Description of the Related Art

Touch panel provides users a more convenient way to input data to a host. However, the threshold, for determining whether the touch panel is touched or not, is a constant in a conventional touch device. Because noise signal may be created by the sensing data on the touch panel according to environment, temperature and/or humidity, an error action may be occurred if the threshold is set to a relatively low value, or, the sensitivity of the touch panel is relatively low if the threshold is set to a relatively high value.

Therefore, how to enhance the sensitivity of the touch device through compensating the effects of environment, temperature and/or humidity to sensing data is the main problem in present.

SUMMARY OF EMBODIMENTS

The present invention is related to a threshold compensation method, applied to a touch device, for increasing the sensitivity of the touch device.

An embodiment of the present invention provides a threshold compensation method, applied to a touch device comprising a plurality of touch points, comprising steps of: selecting at least one of the plurality of touch points as a selected object; obtaining a sensing data of each the touch point of the selected object in each of multiple initializing frequency periods; obtaining a sensing data difference value between the sensing data of each the touch point of the selected object in each adjacent two of the initializing frequency periods; obtaining a particular sensing data difference value according to the multiple sensing data difference values of the selected object in the multiple initializing frequency periods; and setting a default threshold of the selected object according to the particular sensing data difference value. In the exemplary embodiment, the particular sensing data difference value is a maximum sensing data difference value in the multiple sensing data difference values, an average of the maximum sensing data difference value and a minimum sensing data difference value in the multiple sensing data difference values, or a median sensing data difference value in the multiple sensing data difference values.

In one embodiment, the above mentioned step of setting a default threshold of the selected object according to the particular sensing data difference value comprises steps of: defining the particular sensing data difference value as a first threshold; determining whether the first threshold is greater than a preset maximum threshold; and setting the preset maximum threshold as the default threshold if the first threshold is greater than the preset maximum threshold, otherwise setting the first threshold as the default threshold.

In one embodiment, the above mentioned threshold compensation method further comprises a step of: setting an average of the multiple sensing data of the selected object in the multiple initializing frequency periods as a baseline of the selected object.

In one embodiment, the above mentioned threshold compensation method further comprises steps of: setting the default threshold as a current dynamic threshold of the selected object in a touching operation frequency period; obtaining a sensing data of each the touch point of the selected object in the touching operation frequency period and a baseline difference value between the sensing data in the touching frequency period and the baseline, and thereby obtaining at least one baseline difference value; obtaining a maximum baseline difference value in the at least one baseline difference value; and determining whether updating the current dynamic threshold according to a comparison result of the maximum baseline difference value with the default threshold.

In one embodiment, the above mentioned threshold compensation method further comprises steps of: holding the current dynamic threshold of the selected object if the maximum baseline difference value is greater than the default threshold; and updating the current dynamic threshold of the selected object according to the maximum baseline difference value if the maximum baseline difference value is not greater than the default threshold.

In one embodiment, the above mentioned step of updating the current dynamic threshold of the selected object according to the maximum baseline difference value comprises steps of: creating a new threshold by adding the maximum baseline difference value with a constant or applying the maximum baseline difference value to a linear function; comparing the new threshold with a preset maximum threshold of the selected object; updating the current dynamic threshold of the selected object to be preset the maximum threshold if the new threshold is greater than the preset maximum threshold; and updating the current dynamic threshold of the selected object to be the new threshold if the new threshold is not greater than the preset maximum threshold.

Another embodiment of the present invention provides a threshold compensation method, applied to a touch device comprising a plurality of touch points, comprising steps of: obtaining a sensing data of each the touch point of a selected object selected from the plurality of touch points; obtaining a baseline difference value between the sensing data of each the touch point of the selected object in an frequency period and a baseline of the selected object, and thereby obtaining at least one baseline difference value; obtaining a maximum baseline difference value in the at least one baseline difference value; determining whether updating a current dynamic threshold of the selected object according to a comparison result of the maximum baseline difference value with the current dynamic threshold of the selected object; and updating the current dynamic threshold of the selected object according to the maximum baseline difference value if the maximum baseline difference value is not greater than the current dynamic threshold of the selected object.

In one embodiment, the above mentioned threshold compensation method further comprises steps of: holding the current dynamic threshold of the selected object if the maximum baseline difference value is greater than the current dynamic threshold of the selected object.

In one embodiment, the above mentioned step of updating the current dynamic threshold of the selected object according to the maximum baseline difference value comprises steps of: creating a new threshold by adding the maximum baseline difference value with a constant or applying the maximum baseline difference value to a linear function; comparing the new threshold with a preset maximum threshold of the selected object; updating the current dynamic threshold of the selected object to be the preset maximum threshold if the new threshold is greater than the preset maximum threshold; and updating the current dynamic threshold of the selected object to be the new threshold if the new threshold is not greater than the preset maximum threshold.

In one embodiment, the above mentioned threshold compensation method further comprises steps of: obtaining both the baseline of the selected object and the default threshold of the selected object through executing an initializing program in the touch device, wherein the baseline and the default threshold of the selected object are both related to the sensing data of each touch point of the selected object in the execution period of the initializing program.

In one embodiment, the executing of the initializing program comprises steps of: obtaining the sensing data of each the touch point of the selected object in each of multiple initializing frequency periods of the execution period of the initializing program; obtaining a sensing data difference value between the sensing data of each the touch point of the selected object in each adjacent two of the initializing frequency periods; obtaining a particular sensing data difference value (e.g., a maximum sensing data difference value, an average of the maximum sensing data difference value and a minimum sensing data difference value, or a median sensing data difference value) according to the multiple sensing data difference values of the selected object in the multiple initializing frequency periods; setting the default threshold of the selected object according to the particular sensing data difference value; and setting an average of the multiple sensing data of the selected object in the multiple initializing frequency periods as a baseline of the selected object.

In one embodiment, the above mentioned step of setting the default threshold of the selected object according to the particular sensing data difference value comprises steps of: defining the particular sensing data difference value as a first threshold; determining whether the first threshold is greater than a preset maximum threshold; and setting the preset maximum threshold as the default threshold if the first threshold is greater than the preset maximum threshold, otherwise setting the first threshold as the default threshold.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

Figure 1:
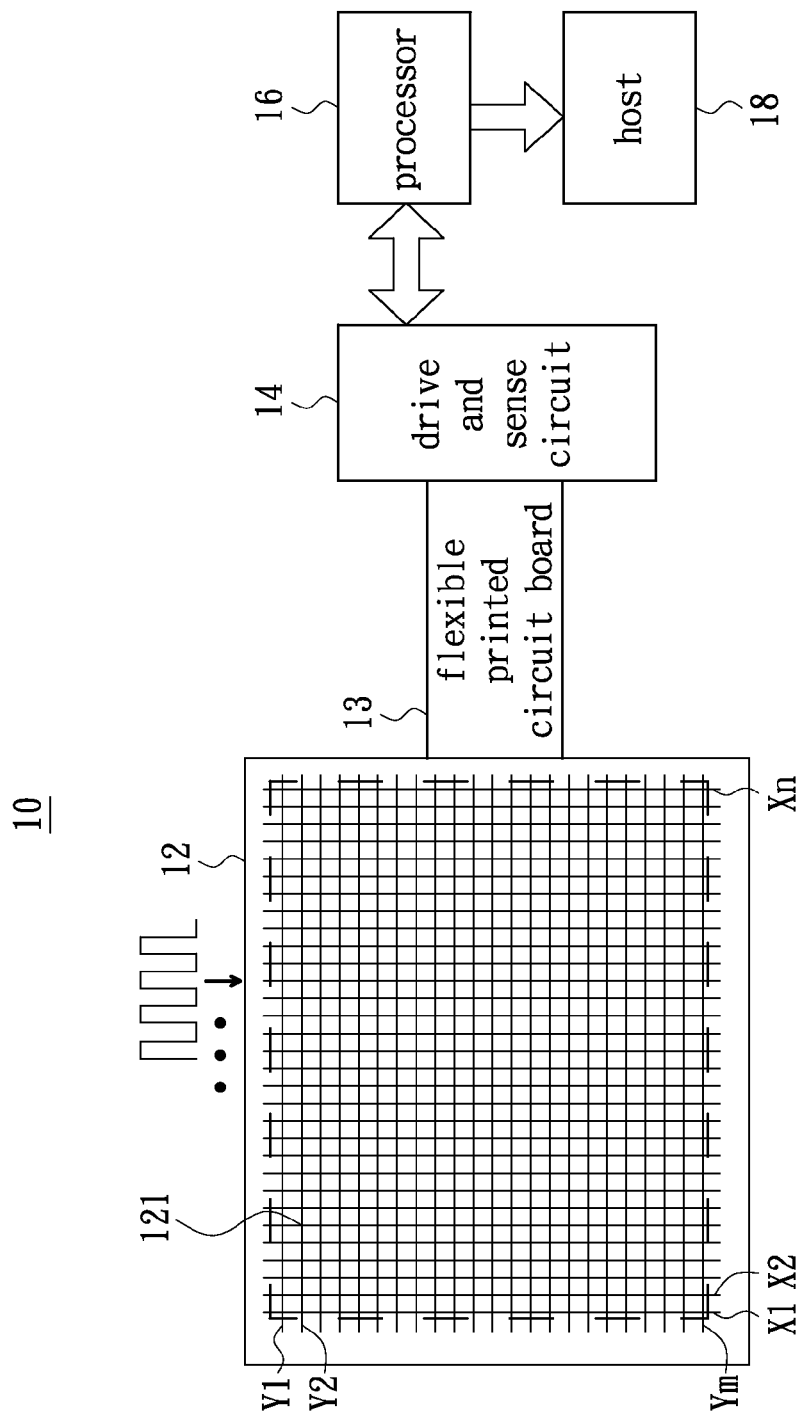
FIG. 1 is a schematic structural block diagram of a touch device capable of executing a threshold compensation method of an embodiment of the present invention.

FIG. 1 is a schematic structural block diagram of a touch device capable of executing a threshold compensation method of an embodiment of the present invention. The touch device 10 includes a touch panel 12, a drive and sense circuit 14, a processor 16 and a host 18. Scan lines (X1, X2, Xn) and sense lines (Y1, Y2, Ym) are arranged on the touch panel 12, where n and m are positive integers. As depicted in FIG. 1, the scan lines (X1, X2, . . . , Xn) are arranged crossing/intersecting with the sense lines (Y1, Y2, . . . , Ym) and each of the (n×m) numbers of crossing points is defined as a touch point 121. The drive and sense circuit 14 is electrically coupled to the touch panel 12 e.g., through a flexible printed circuit board 13 and is for performing driving and sensing functions on the touch panel 12. For example, the drive and sense circuit 14 can provide a driving signal (e.g., the periodic square-wave signal depicted in FIG. 1) to the scan lines (X1, X2, . . . , Xn) for scanning in a manner of column by column, and simultaneously sense output signals (i.e., corresponding to sensing data of the touch points 121) of the respective sense lines (Y1, Y2, . . . , Ym) in a manner of row by row. The processor 16 is electrically couple to the drive and sense circuit 14 and is for processing the sensing data of the touch points 121 transmitted from the drive and sense circuit 14. The main function of the processor 16 is for determining whether one or multiple of the touch points 121 is/are touched and also determining the touched position(s) on the touch panel 12. The determining result is then transmitted to the host 18 via a communication interface.

Figure 2A:
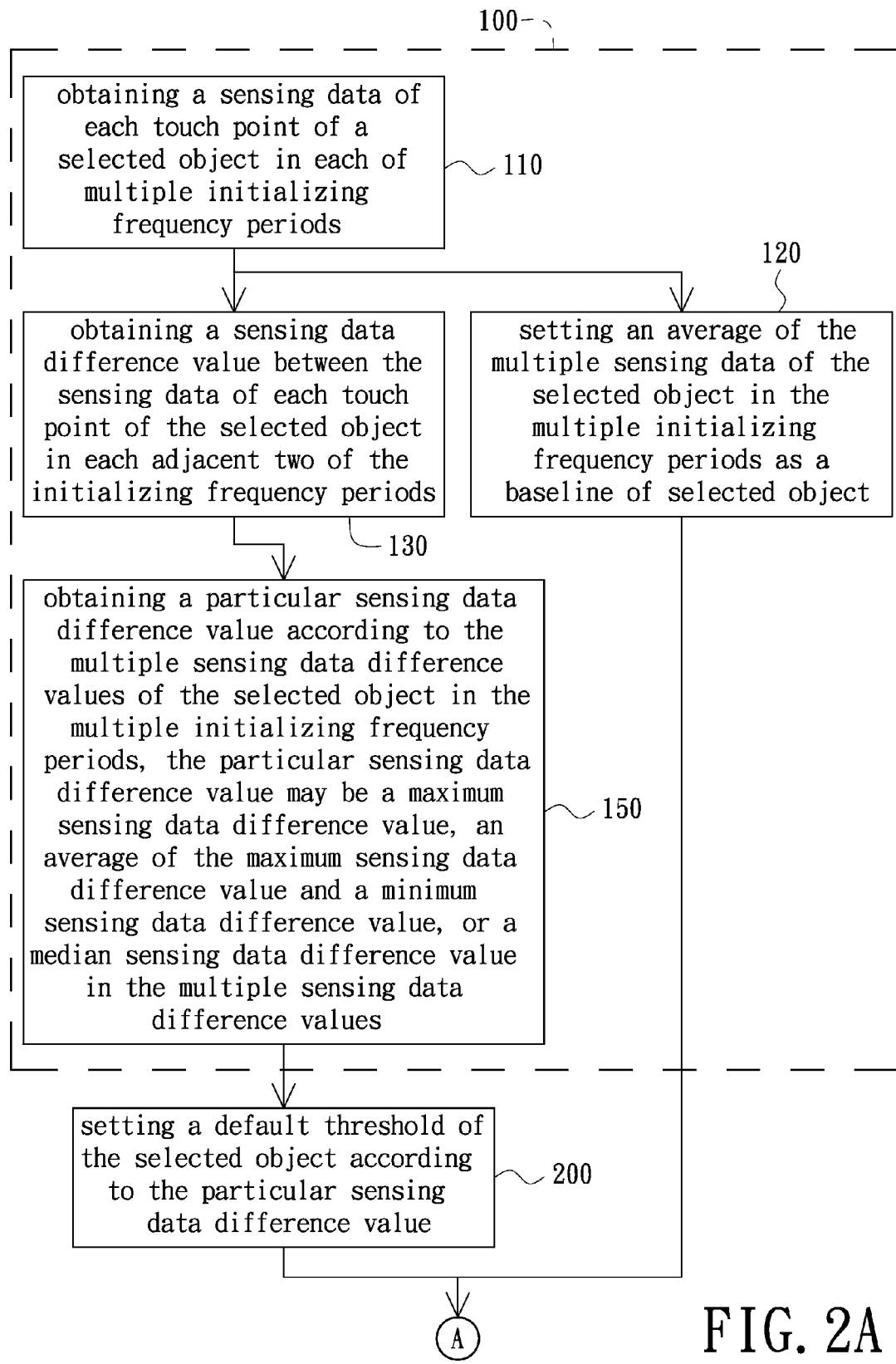
FIGS. 2A and 2B together show a flow chart of the threshold compensation method of the embodiment.
Figure 2B:
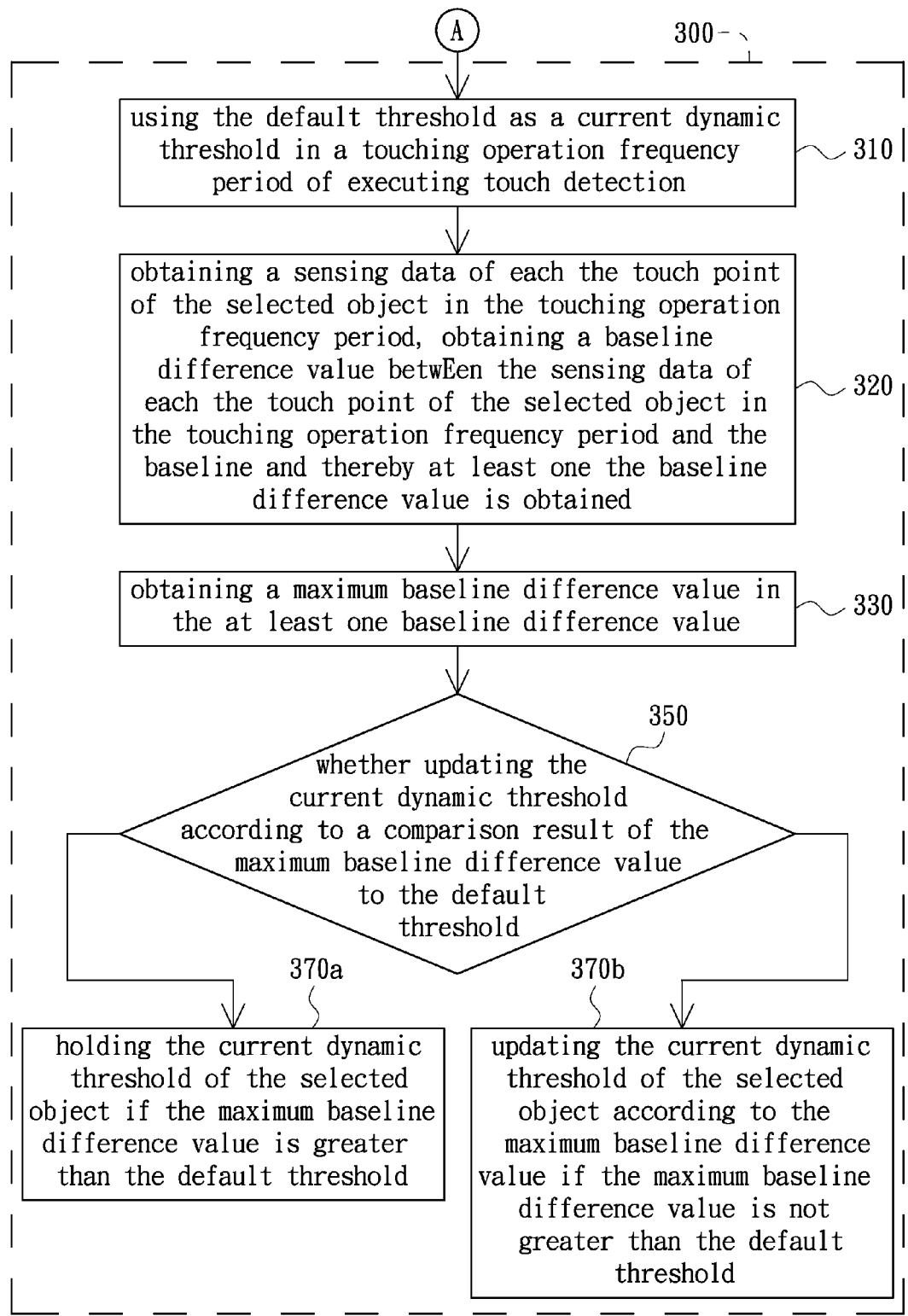

FIGS. 2A and 2B together show a flow chart of the threshold compensation method of the embodiment. To get much clear understanding of the process of the threshold compensation method in the embodiment, FIG. 1 is also referred while explaining the process of the threshold compensation method as depicted in FIGS. 2A and 2B. As depicted in FIGS. 2A and 2B together, the threshold compensation method of the embodiment mainly includes steps 100, 200 and 300.

Step 100: obtaining a maximum sensing data difference value of a selected object in an initializing period and obtaining a baseline of the selected object, through executing an initializing program. In the embodiment, the initializing program can be automatically executed in the touch device while the touch device is booted up, or, the initializing program can be triggered by a user according to user's demand. The selected object can be the (n×m) numbers of touch points 121 which are enclosed by a dot-line frame as depicted in FIG. 1, or n numbers of the touch points 121 located on a same sense line, or a single one touch point 121. A selected object including (n×m) numbers of touch points 121 as depicted in FIG. 1 is given here as an example for explaining the threshold compensation method of the embodiment. The step 100 includes sub-steps 110, 130, 150 and 120.

Sub-step 110: obtaining a sensing data of each the touch point 121 of the selected object in each of multiple initializing frequency periods. Basically, the foregoing initializing period includes multiple (e.g., z numbers of) successive initializing frequency periods such as frame periods. It is understood that there are n×m×z numbers of sensing data if the initializing period includes z numbers of initializing frequency periods. In the embodiment, the n×m×z numbers of sensing data are sensed by the drive and sense circuit 14 and then transmitted to the processor 16 for subsequent processing.

Sub-step 130: obtaining a sensing data difference value between two sensing data created by each the touch point 121 of the selected object in each two adjacent initializing frequency periods. Because there are n×m numbers of touch points 121 in the selected object and there are z numbers of initializing frequency periods in the initializing period as described above, therefore there are n×m×(z−1) numbers of sensing data difference values created by the processor 16.

Sub-step 150: obtaining a particular sensing data difference value according to the n×m×(z−1) numbers of sensing data difference values of the selected object in the initializing period. In one embodiment, the particular sensing data difference value is a maximum sensing data difference value in the n×m×(z−1) numbers of sensing data difference values. To obtain the maximum sensing data difference value, the processor 16 can firstly select the sensing data difference value with a maximum value in the n×m numbers of sensing data difference values which are created in each two adjacent initializing frequency periods, and then select the sensing data difference value with a maximum value in the z−1 numbers of sensing data difference values with the maximum values which are created in the z numbers of initializing frequency periods as the maximum sensing data difference value. The maximum sensing data difference value is then stored in the touch device 10 by the processor 16. In other embodiments, the particular sensing data difference value is an average of the maximum sensing data difference value and a minimum sensing data difference value in the n×m×(z−1) numbers of sensing data difference values, or a median sensing data difference value in the n×m×(z−1) numbers of sensing data difference values instead.

Sub-step 120: setting an average of the multiple sensing data of the selected object in the initializing frequency periods as a baseline of the selected object. To obtain the baseline, the processor 16 can firstly get z−1 numbers of average values through averaging each the n×m×2 sensing data of the selected object which are created in two adjacent initializing frequency periods, and then even/average the z−1 sensing data.

After the step 100 of executing the initializing program, the step 200 of setting the default threshold of the selected object is accordingly executed.

Step 200: setting the default threshold of the selected object according to the particular sensing data difference value. In particular, the step 200 includes several sub-steps as follows: a threshold is firstly created/calculated according to the particular sensing data difference value, and the created threshold is then compared with a preset maximum threshold. In the exemplary embodiment, the created threshold is the particular sensing data difference obtained in the sub-step 150, for example, the maximum sensing data difference value, the average of the maximum sensing data difference value and the minimum sensing data difference value, or the median sensing data difference value. The preset maximum threshold is set as the default threshold of the selected object if the created threshold is greater than the preset maximum threshold; alternatively, the created threshold is set as the default threshold if the created threshold is not greater than the preset maximum threshold. After the step 200 is complete, the automatic setting of the default threshold of the touch device 10 is complete consequently.

Afterwards, the step 300 of executing touch detection as depicted in FIG. 2B is performed after obtaining the default threshold and the baseline. In particular, the step 300 includes several sub-steps 310, 330, 350, 370*a* and 370*b* as follows.

Firstly, the default threshold is set as a current dynamic threshold of the selected object in a touching operation frequency period of executing touch detection (sub-step 310). Then, a sensing data of each the touch point of the selected object in the touching operation frequency period is obtained, and a baseline difference value between the sensing data of each the touch point of the selected object in the touching operation frequency period and the baseline is obtained and at least one the baseline difference value is obtained (sub-step 320). Subsequently, a maximum baseline difference value in the at least one baseline difference value is obtained (sub-step 330). Whether updating the current dynamic threshold according to a comparison result of the maximum baseline difference value to the default threshold then is determined (sub-step 350). If the comparison result indicates the maximum baseline difference value is greater than the default threshold, the current dynamic threshold of the selected object is held (sub-step 370*a*), whereas, if the comparison result indicates the maximum baseline difference value is not greater than the default threshold, the current dynamic threshold of the selected object is updated for subsequent use (sub-step 370*b*).

Figure 3:
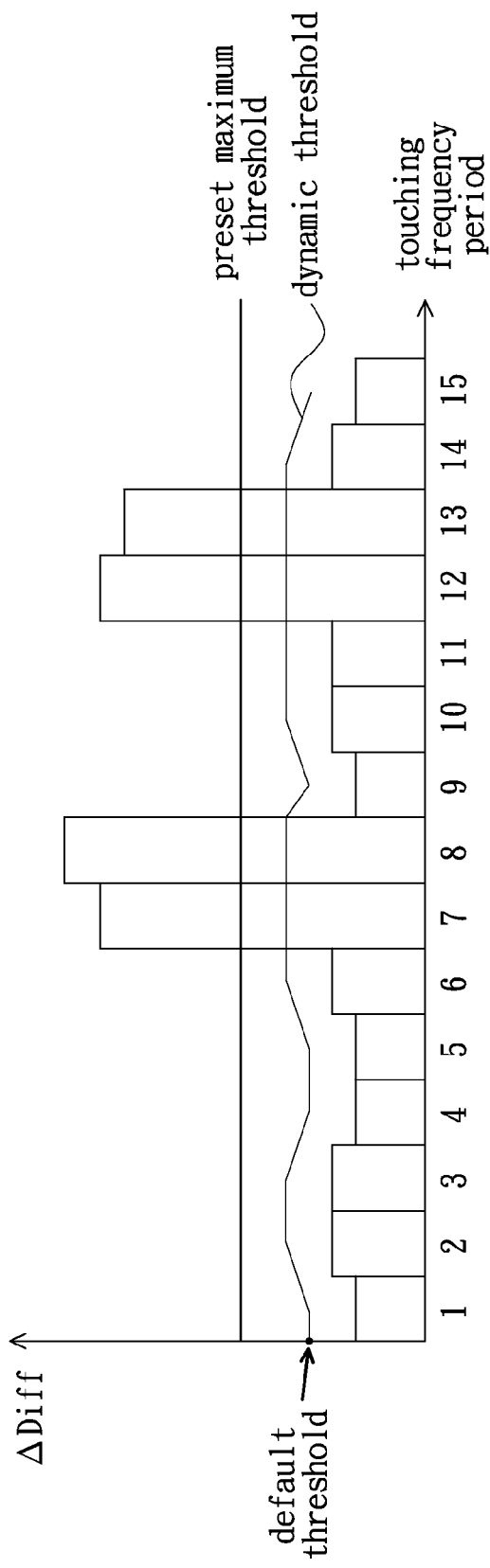
FIG. 3 is an operation status chart of the threshold compensation method of the embodiment executed in a touching period for touch detection.

FIG. 3 is an operation status chart of the threshold compensation method of the embodiment executed in a touching period for touch detection. To get much clear understanding of the process of the threshold compensation method in the embodiment, FIG. 1 is also referred while explaining the process of the threshold compensation method as depicted in FIG. 3. A dynamic updating of threshold in 1st through 15th touching frequency periods of the touching period, for explaining the threshold compensation method of the embodiment, is given here as an example as depicted in FIG. 3. The dynamical updating of threshold in the touching period as depicted in FIG. 3 is executed after the execution of the initializing program of the touch device 10.

In particular, in the 1st touching frequency period, the current dynamic threshold is set to be the value of the default threshold which is obtained from the execution of the initializing program as described above. After the sensing data of each the touch point 121 of the selected object is obtained by the drive and sense circuit 14 and transmitted to the processor 16, a baseline difference value between the sensing data and the baseline is created by the processor 16. It is understood that there are n×m numbers of baseline difference values created by the processor 16 if there are n×m numbers of touch points 121 in the selected object. A maximum baseline difference value ΔDiff is then obtained from the n×m numbers of baseline difference values by processor 16. In the embodiment, the determination of whether updating the current dynamic threshold is based on comparing the current dynamic threshold with the maximum baseline difference value ΔDiff.

As depicted in FIG. 3, the maximum baseline difference value ΔDiff in the 1st touching frequency period is less than the current dynamic threshold, which represents that the touch points 121 of the selected object are determined not be touched by a user so as the current dynamic threshold is necessarily to be updated. Then, a new threshold is created based on the maximum baseline difference value ΔDiff by the processer 16. The new threshold can be obtained from the maximum baseline difference value ΔDiff added by a constant or obtained from the maximum baseline difference value ΔDiff applying to a linear function. The smaller one between the new threshold and a preset maximum threshold is selected as the current dynamic threshold in the next (e.g., 2nd) touching frequency period.

As depicted in FIG. 3, because the maximum baseline difference value ΔDiff is less than the current dynamic threshold in each of the 2nd-6th, 9th-11th and 14th-15th touching frequency periods, the touch points 121 of the selected object are determined not be touched by a user in these touching frequency periods so as the current dynamic thresholds are necessarily to be updated. The process of the updating the current dynamic threshold in each of the 2nd-6th, 9th-11th and 14th-15th touching frequency periods is same as that in the first touching frequency period as described above, no any unnecessary details are given here.

As depicted in FIG. 3, because the maximum baseline difference value ΔDiff is greater than the current dynamic threshold in each of the 7th-8th and 12th-13th touching frequency periods, one or multiple of the touch points 121 of the selected object is/are determined be touched by a user in these touching frequency periods. Because the variations of sensing data in a touching frequency period while one or multiple of the touch points 121 of the selected object is/are touched are relatively high, errors may be occurred while updating the current dynamic threshold under the relatively high variation of sensing data. To prevent that, the current dynamic threshold in each of the 7th-8th and 12th-13th touching frequency periods is unsuitable to be updated, i.e., the current dynamic thresholds in each of the 7th-8th and 12th-13th touching frequency periods are hold.

To sum up, because the default threshold in the conventional touch device is with a constant value which is obtained by experiments before the touch device is launched to market, the default threshold in the conventional touch device may not suitable to every individual user. However, the default threshold in the embodiments of the present invention is automatically set according to the operation status of the touch device based on the maximum sensing data difference value of the selected object which is obtained through executing the initializing program in the initializing period, so as the problem occurred in the conventional touch device can be prevented in the embodiments. Moreover, the threshold of the touch device in the embodiments is dynamically modulated in the touching period after the initializing period; accordingly the effects of environment to the sensing data can be dynamically compensated while in the touching period.

In short, the sensitivity of the touch device in the embodiments is increased through automatically setting the default threshold in the initializing period and/or dynamically updating the threshold in the touching period in the embodiments.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A threshold compensation method applied to a touch device comprising a plurality of touch points, the threshold compensation method comprising steps of:
   selecting at least one of the plurality of touch points as a selected object;
   obtaining sensing data of each of the touch points of the selected object in each of multiple initializing frequency periods;
   obtaining a sensing data difference value between the sensing data of each of the touch points of the selected object in each adjacent two of the initializing frequency periods;
   obtaining a particular sensing data difference value according to multiple sensing data difference values of the selected object in the multiple initializing frequency periods, wherein the particular sensing data difference value is selected from a maximum sensing data difference value in the multiple sensing data difference values, an average of the maximum sensing data difference value and a minimum sensing data difference value in the multiple sensing data difference values, and a median sensing data difference value in the multiple sensing data difference values; and
   setting a default threshold of the selected object according to the particular sensing data difference value;
   wherein the step of setting the default threshold of the selected object according to the particular sensing data difference value comprises steps of:
   defining the particular sensing data difference value as a first threshold;
   determining whether the first threshold is greater than a preset maximum threshold; and
   setting the preset maximum threshold as the default threshold if the first threshold is greater than the preset maximum threshold, otherwise setting the first threshold as the default threshold.

2. A threshold compensation method applied to a touch device comprising a plurality of touch points, the threshold compensation method comprising steps of:
   selecting at least one of the plurality of touch points as a selected object;
   obtaining sensing data of each of the touch points of the selected object in each of multiple initializing frequency periods;
   obtaining a sensing data difference value between the sensing data of each of the touch points of the selected object in each adjacent two of the initializing frequency periods;
   obtaining a particular sensing data difference value according to multiple sensing data difference values of the selected object in the multiple initializing frequency periods, wherein the particular sensing data difference value is selected from a maximum sensing data difference value in the multiple sensing data difference values, an average of the maximum sensing data difference value and a minimum sensing data difference value in the multiple sensing data difference values and a median sensing data difference value in the multiple sensing data difference values; and
   setting a default threshold of the selected object according to the particular sensing data difference value;
   wherein the threshold compensation method further comprising steps of:
   setting an average of multiple sensing data of the selected object in the multiple initializing frequency periods as a baseline of the selected object;
   setting the default threshold as a current dynamic threshold of the selected object in a touching operation frequency period;
   obtaining the sensing data of each of the touch points of the selected object in the touching operation frequency period and a baseline difference value between the sensing data in the touching operation frequency period and the baseline, and thereby obtaining at least one the baseline difference value;

obtaining a maximum baseline difference value in the at least one baseline difference value; and determining whether to update the current dynamic threshold according to a comparison result of the maximum baseline difference value to the default threshold.

3. The threshold compensation method according to claim 2, further comprising steps of:

holding the current dynamic threshold of the selected object if the maximum baseline difference value is greater than the default threshold; and updating the current dynamic threshold of the selected object according to the maximum baseline difference value if the maximum baseline difference value is not greater than the default threshold.

4. The threshold compensation method according to claim 3, wherein the step of updating the current dynamic threshold of the selected object according to the maximum baseline difference value comprises steps of:

creating a new threshold by adding the maximum baseline difference value with a constant or applying the maximum baseline difference value to a linear function;

comparing the new threshold with a preset maximum threshold of the selected object;

updating the current dynamic threshold of the selected object to be the preset maximum threshold if the new threshold is greater than the preset maximum threshold; and updating the current dynamic threshold of the selected object to be the new threshold if the new threshold is not greater than the preset maximum threshold.

5. A threshold compensation method, applied to a touch device comprising a plurality of touch points, the threshold compensation method comprising steps of:

obtaining sensing data of each of the touch points of a selected object selected from the plurality of touch points;

obtaining a baseline difference value between the sensing data of each of the touch points of the selected object in a frequency period and a baseline of the selected object, and thereby obtaining at least one baseline difference value;

obtaining a maximum baseline difference value in the at least one baseline difference value; and determining whether to update a current dynamic threshold of the selected object according to a comparison result of the maximum baseline difference value to the current dynamic threshold of the selected object; and updating the current dynamic threshold of the selected object according to the maximum baseline difference value if the maximum baseline difference value is not greater than the current dynamic threshold of the selected object.

6. The threshold compensation method according to claim 5, further comprising steps of:

holding the current dynamic threshold of the selected object if the maximum baseline difference value is greater than the current dynamic threshold of the selected object.

7. The threshold compensation method according to claim 5, wherein the step of updating the current dynamic threshold of the selected object according to the maximum baseline difference value comprises steps of:

creating a new threshold by adding the maximum baseline difference value with a constant or applying the maximum baseline difference value to a linear function;

comparing the new threshold with a preset maximum threshold of the selected object;

updating the current dynamic threshold of the selected object to be the maximum threshold if the new threshold is greater than the preset maximum threshold; and updating the current dynamic threshold of the selected object to be the new threshold if the new threshold is not greater than the preset maximum threshold.

8. The threshold compensation method according to claim 5, further comprising steps of:

obtaining both the baseline of the selected object and the default threshold of the selected object through executing an initializing program by the touch device, wherein the baseline and the default threshold of the selected object are both related to the sensing data of each of the touch points of the selected object in the execution period of the initializing program.

9. The threshold compensation method according to claim 8, wherein the executing of the initializing program comprises steps of:

obtaining the sensing data of each of the touch points of the selected object in each of multiple initializing frequency periods of the execution period of the initializing program;

obtaining a sensing data difference value between the sensing data of each of the touch points of the selected object in each adjacent two of the initializing frequency periods;

obtaining a particular sensing data difference value according to the multiple sensing data difference values of the selected object in the multiple initializing frequency periods, wherein the particular sensing data difference value is selected from a maximum sensing data difference value in the multiple sensing data difference values, an average of the maximum sensing data difference value and a minimum sensing data difference value in the multiple sensing data difference values, and a median sensing data difference value in the multiple sensing data difference values; and setting the default threshold of the selected object according to the particular sensing data difference value.

10. The threshold compensation method according to claim 9, wherein the step of setting the default threshold of the selected object according to the particular sensing data difference value comprises steps of:

defining the particular sensing data difference value as a first threshold;

determining whether the first threshold is greater than a preset maximum threshold; and setting the preset maximum threshold as the default threshold if the first threshold is greater than the preset maximum threshold, otherwise setting the first threshold as the default threshold.

11. The threshold compensation method according to claim 8, wherein the executing of the initializing program comprises the step of setting an average of the multiple sensing data of the selected object in the multiple initializing frequency periods as a baseline of the selected object.

* * * * *